United States Patent
Ranini et al.

(10) Patent No.: US 7,874,276 B2
(45) Date of Patent: Jan. 25, 2011

(54) FUEL INJECTION CONTROL METHOD FOR AN INTERNAL-COMBUSTION ENGINE AND ENGINE USING THE SAME

(75) Inventors: Alain Ranini, Rueil-Malmaison (FR); Sébastien Potteau, Triel sur Seine (FR)

(73) Assignee: Institut Francais du Petrole, Cedex (FR)

( * ) Notice: Subject to any disclaimer, the term of this patent is extended or adjusted under 35 U.S.C. 154(b) by 439 days.

(21) Appl. No.: 11/816,292

(22) PCT Filed: Feb. 13, 2006

(86) PCT No.: PCT/FR2006/000317

§ 371 (c)(1),
(2), (4) Date: Sep. 12, 2008

(87) PCT Pub. No.: WO2006/087451

PCT Pub. Date: Aug. 24, 2006

(65) Prior Publication Data

US 2009/0020098 A1   Jan. 22, 2009

(30) Foreign Application Priority Data

Feb. 16, 2005   (FR) .................................. 05 01610

(51) Int. Cl.
  *F02F 3/26*   (2006.01)
  *F02B 3/00*   (2006.01)
  *F02B 19/10*  (2006.01)
(52) U.S. Cl. ...................... 123/299; 123/276
(58) Field of Classification Search ........... 123/261, 123/275, 276, 279, 294, 298–300, 305, 478, 123/480; 701/101–105
  See application file for complete search history.

(56) References Cited

U.S. PATENT DOCUMENTS 5,103,776 A * 4/1992 Sato ........................... 123/276

(Continued)

FOREIGN PATENT DOCUMENTS

| EP | 0 661 432 A2 | 7/1995 |
| FR | 2 818 324 | 6/2002 |
| FR | 2 818 325 | 6/2002 |
| WO | WO 2005/001255 A1 | 1/2005 |

OTHER PUBLICATIONS

International Search Report PCT/FR2006/000317, mailed May 19, 2006.

*Primary Examiner*—Willis R Wolfe, Jr.
(74) *Attorney, Agent, or Firm*—Antonelli, Terry, Stout & Kraus, LLP.

(57) ABSTRACT

The invention relates to a method for control of fuel injection for an internal combustion engine, in particular with direct fuel injection, comprising at least one cylinder (10), one piston (30) running in said cylinder, with a projection (34) arranged in a concave bowl (32), a fuel injector (22) and a combustion chamber (26). According to the invention, during high engine loads, a first amount of fuel is injected at a piston (30) position of between 35 and 70° before the top dead centre position of said piston, followed by an injection of at least one second amount of fuel, the first amount of fuel being less than the second amount and the fuel is injected into said combustion chamber by means of an injector (22) with a cone angle ($a_1$) less than or equal to 2Arctg CD/2F where CD is the diameter of the cylinder (10) and F the distance between the points of origin of the fuel jets from the injector (22) and the position of the piston corresponding to a crankshaft angle of 50° with relation to the top dead centre (PMH) of the piston.

5 Claims, 2 Drawing Sheets

U.S. PATENT DOCUMENTS

| | | | |
|---|---|---|---|
| 5,115,776 A * | 5/1992 | Ohno et al. | 123/276 |
| 5,119,780 A * | 6/1992 | Ariga | 123/300 |
| 6,637,403 B2 * | 10/2003 | Walter et al. | 123/305 |
| 6,640,772 B2 * | 11/2003 | Gatellier et al. | 123/305 |
| 6,691,670 B1 * | 2/2004 | Gatellier et al. | 123/305 |
| 6,827,059 B2 * | 12/2004 | Gatellier et al. | 123/276 |
| 7,156,069 B2 * | 1/2007 | Ono et al. | 123/276 |
| 7,677,221 B2 * | 3/2010 | Knop et al. | 123/276 |
| 2002/0117146 A1 | 8/2002 | Gatellier et al. | |

* cited by examiner

FUEL INJECTION CONTROL METHOD FOR AN INTERNAL-COMBUSTION ENGINE AND ENGINE USING THE SAME

FIELD OF THE INVENTION

The present invention relates to a fuel injection control method for an internal-combustion engine, notably of direct injection type, and to an engine using same.

It more particularly relates to a method intended for a diesel engine that can run according to two combustion modes. A homogeneous mode, for low and medium engine loads, with a fuel injection allowing to obtain homogeneous mixing of the fuel with air or with a mixture of air and of recirculated exhaust gas, before combustion starts. The other combustion mode, referred to as conventional combustion, consists of a fuel injection in the vicinity of the piston top dead centre and of a diffusion combustion, this mode being preferably used at high loads.

BACKGROUND OF THE INVENTION

Such an engine type, as better described in French patent applications No. 2,818,324 and 2,818,325, comprises at least a cylinder, a piston sliding in this cylinder, a combustion chamber delimited on one side by the upper face of the piston comprising a teat arranged in the centre of a concave bowl and at least one injection nozzle for injecting fuel with a nappe angle less than or equal to $$2 \text{Arctg} \frac{CD}{2F},$$

where CD is the diameter of the cylinder and F the distance between the point of origin of the fuel jets from the injection nozzle and the position of the piston corresponding to a crank angle of 50° to the top dead centre.

Thus, in case of early injection, i.e. when the position of the piston is in the vicinity of 50° crank angle for the injection phase selected in relation to the piston top dead centre, the fuel does not come into contact with the cylinder wall and it mixes with the air or the mixture of air and of recirculated exhaust gas present in the combustion chamber.

However, in the case of very high loads, for example at 4000 rpm full load, the engine runs in conventional combustion mode. In this combustion mode, and considering the relatively low compression ratio (of the order of 14), the fuel is conventionally injected into the combustion chamber in a single sequence, but it burns only after a certain delay time linked with the interaction of the fuel jets with the piston wall, existing with the type of homogeneous combustion developed by the applicant. This leads to a decrease in performances, notably as regards the developed power.

The present invention aims to overcome the aforementioned drawbacks by means of a method allowing the fuel to be introduced in such a way that the self-ignition delay thereof is reduced.

SUMMARY OF THE INVENTION

The present invention therefore relates to a fuel injection control method for an internal-combustion engine, notably of direct injection type, comprising at least a cylinder, a piston sliding in this cylinder and comprising a teat arranged in a concave bowl, a fuel injection nozzle and a combustion chamber, characterized in that, for very high engine loads, a first amount of fuel is injected for a position of the piston ranging between 35° and 70° before the top dead centre of this piston, followed by injection of at least a second amount of fuel, the first amount of fuel being smaller than the second, and in that the fuel is injected into said combustion chamber with an injection nozzle having a nappe angle ($a_1$) less than or equal to $$2 \text{Arctg} \frac{CD}{2F},$$

where CD is the diameter of the cylinder and F the distance between the point of origin of the fuel jets from the injection nozzle and the position of the piston corresponding to a crank angle of 50° to the top dead centre (TDC) of the piston.

Preferably, injection of the second amount of fuel can start between 20° and 35° before the piston top dead centre.

Injection of the second amount of fuel can be continued after the piston top dead centre.

The fuel can be injected with a ratio of the first amount of fuel to the second amount ranging between 1/10 and 1/20.

The invention also relates to an internal-combustion engine, notably of direct injection type, comprising at least a cylinder, a piston sliding in this cylinder, a combustion chamber delimited on one side by the upper face of said piston comprising a teat arranged in the centre of a concave bowl and a fuel injection nozzle, characterized in that it comprises an injection nozzle having a nappe angle ($a_1$) less than or equal to $$2 \text{Arctg} \frac{CD}{2F},$$

where CD is the diameter of the cylinder and F the distance between the point of origin of the fuel jets from the injection nozzle and the position of the piston corresponding to a crank angle of 50° to the top dead centre, and control and computing means for injecting, at very high engine loads, a first amount of fuel for a position of the piston ranging between 35° and 70° before the top dead centre of this piston, followed by injection of at least a second amount of fuel, the first amount of fuel being smaller than the second.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
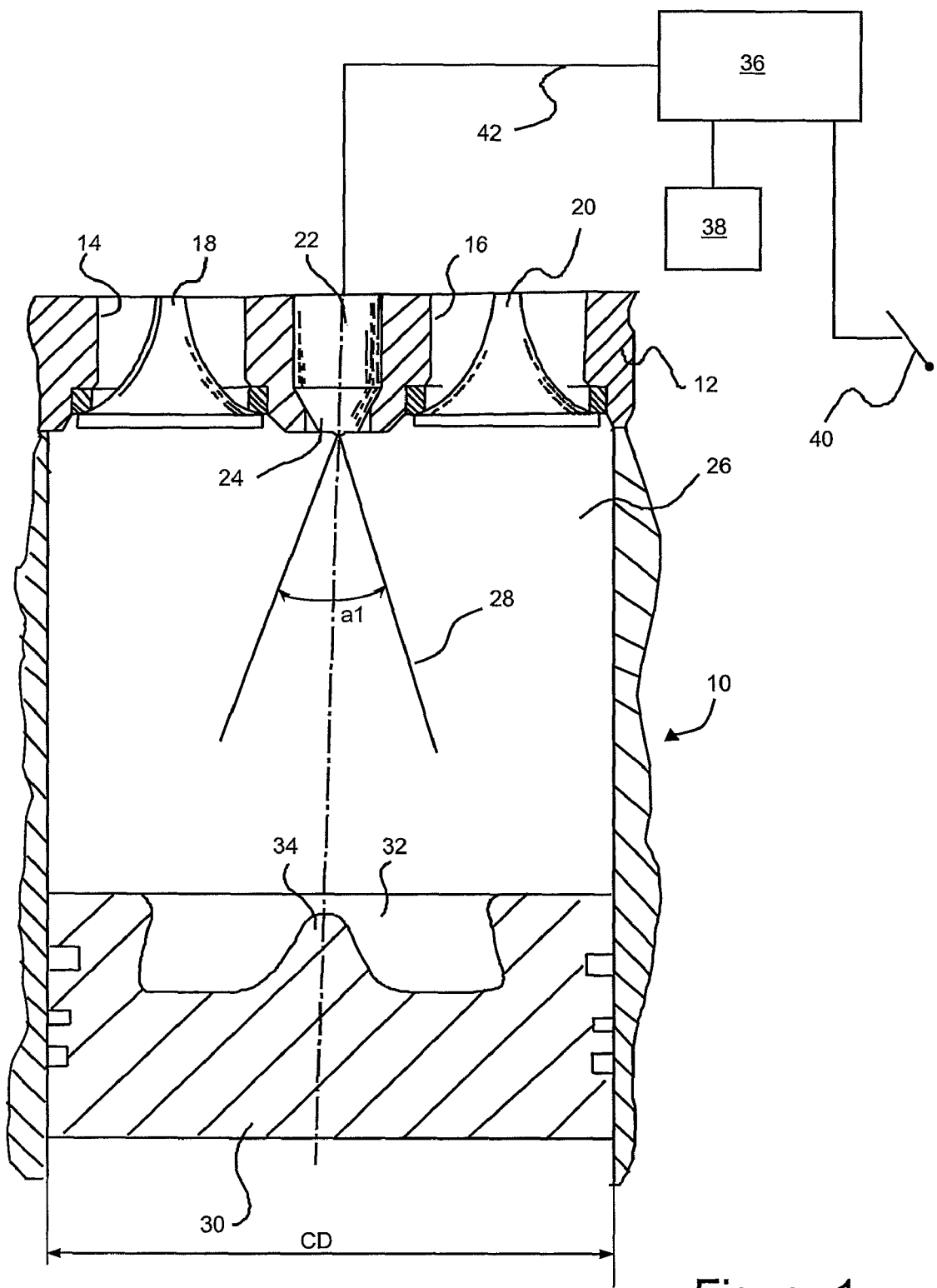
FIG. 1 diagrammatically shows an internal-combustion engine according to the invention.

In connection with FIG. 1, a direct-injection diesel internal-combustion engine comprises at least a cylinder 10 of diameter CD and a cylinder head 12 carrying air intake means and burnt gas exhaust means, here respectively at least one intake pipe 14 for a gaseous fluid such as air or a mixture of air and of recirculated exhaust gas (EGR), at least one burnt gas exhaust pipe 16, opening or closing of the pipes being controlled by an intake valve 18 and an exhaust valve 20. The cylinder head also carries a fuel injection nozzle 22 that is preferably coaxial to the axis of the cylinder and comprises, in the vicinity of its nose 24, a multiplicity of orifices through which the fuel is sprayed into combustion chamber 26 in form of jets 28. The combustion chamber is delimited by the upper face of piston 30, sliding in a rectilinear reciprocating manner in cylinder 10, the inner face of cylinder head 12 opposite this piston and the circular wall of cylinder 10 contained between the two faces. Furthermore, the upper face of the piston comprises a concave bowl 32 within which a teat 34 located substantially in the centre of the bowl rises towards cylinder head 12.

As better described in French patents No. 2,818,324 and 2,818,325 filed by the applicant, which are included in the present application by way of reference, fuel injection nozzle 22 is of small jet nappe angle $a_1$ type. This angle $a_1$ is so selected that the wall of cylinder 10 is never made wet by the fuel for any position of piston 30 between +50° and +α or between −50° and −α, where α represents the crank angle for the injection phase selected in relation to the piston top dead centre, this angle α being greater than 50° and less than or equal to 180° so as to obtain a homogeneous type combustion.

If CD represents the diameter (in mm) of cylinder 10 and F the distance (in mm) between the point of origin of fuel jets 28 and the position of the piston corresponding to a crank angle of 50°, then nappe angle $a_1$ (in degrees) is less than or equal to $$2 \operatorname{Arctg} \frac{CD}{2F}.$$

What is referred to as nappe angle is the vertex angle formed by the cone from the nozzle and whose fictitious peripheral wall passes through all the axes of fuel jets 28.

Advantageously, the angular range for nappe angle $a_1$ is at most 120° and preferably between 40° and 100°.

This engine also comprises a control and computing unit 36, referred to as engine calculator, which is connected by conductors (some being bidirectional) to the different elements and detectors of the engine (diagrammatically represented by box 38 in the figure) in order to be able to receive the various signals emitted by these detectors, such as the position of piston 30 via a position detector connected to the crankshaft this engine is usually equipped with, to process them by computation and then to control the elements of this engine so as to allow smooth running thereof. This unit also receives information on the driver's request, for example the position of accelerator pedal 40. According to this information, engine calculator 36, which contains tables or mappings, sends instructions to the various elements of the engine so as to respond to the driver's request.

This unit is notably suited for control of the fuel injection parameters, such as the amount of fuel injected in the combustion chamber by nozzle 22, and the injection time in the usual combustion cycle of the engine. Unit 36 is therefore connected by control lines 42 to the various control elements (not shown) of nozzles 22.

Thus, during operation, unit 36 knows at any time the working order of the engine and the driver's request.

Therefore, for low and medium loads, the calculator controls fuel injection so as to obtain a homogeneous fuel mixture in the combustion chamber while preventing this fuel from wetting the cylinder walls.

For very high loads, and for an engine rotation of about 4000 rpm, calculator 36 controls injection nozzle 22 in such a way as to achieve, before the piston reaches its combustion top dead centre, a first fuel injection, referred to as primary injection, then at least a second fuel injection, referred to as main injection, in a larger amount. The ratio of the primary injection to the main injection is about 1/10 to 1/20. The primary injection is not carried out too early so as to prevent any wall wetting by the fuel.

What is referred to as very high loads is the working range of the engine from very high loads to full load.

In practice, unit 36 receives instructions resulting from the driver's thrust on the accelerator pedal, such as the pedal depression and the rate of this depression. These instructions are analysed and compared by the calculator according to mappings contained in this unit. If the unit deduces that the instructions received correspond to a request for very high loads, unit 36 controls primary fuel injection for a position of the piston ranging between 35° and 70° before the top dead centre, then it starts the main injection between 20° and 35° before the piston top dead centre (TDC) and it continues this main injection after the TDC if necessary.

The first amount of fuel injected can thus burn, which allows to raise the pressure and the temperature of the mixture present in the combustion chamber. The main fuel injection that follows is performed in a chamber with sizeable pressure/temperature parameters so that this fuel can burn conventionally with a reduced self-ignition delay.

Figure 2:
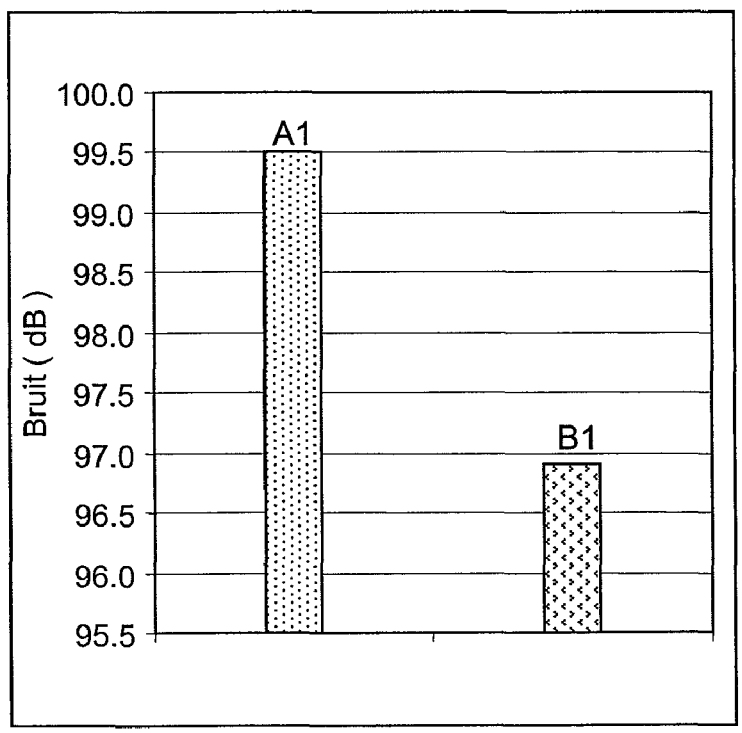
FIG. 2 is a graph showing the combustion noise reduction by means of the method according to the invention.
Figure 3:
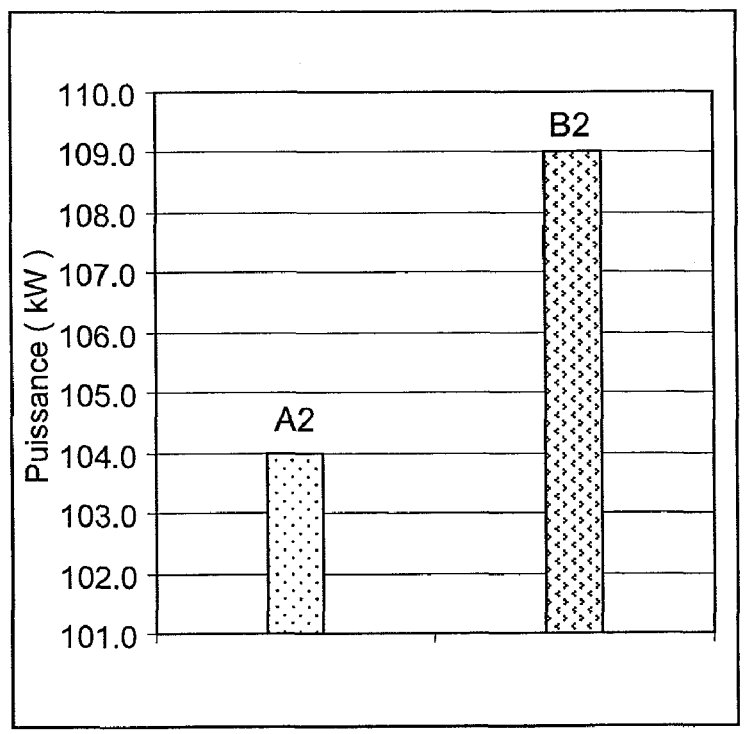
FIG. 3 is also a graph showing the power levels generated by the engine with and without the method according to the invention.

As illustrated in FIGS. 2 and 3, the primary fuel injection thus allows to reduce the combustion noise by about 2 dB (FIG. 2: bar A1 for a fuel injection without primary injection and bar B1 for a fuel injection with primary injection) and to increase the engine power by about 4% (FIG. 3: bar A2 for a fuel injection without primary injection and bar B2 for a fuel injection with primary injection).

The present invention is not limited to the embodiment examples described above and it encompasses any equivalent or variant.

The invention claimed is:

1. An internal-combustion engine, notably of direct injection type, comprising at least a cylinder, a piston sliding in this cylinder, a combustion chamber delimited on one side by the upper face of said piston comprising a teat arranged in the centre of a concave bowl and a fuel injection nozzle, characterized in that it comprises an injection nozzle having a nappe angle ($a_1$) less than or equal to $$2 \operatorname{Arctg} \frac{CD}{2F},$$

where CD is the diameter of cylinder and F the distance between the point of origin of the fuel jets from the injection nozzle and the position of the piston corresponding to a crank angle of 50° to the top dead centre (TDC), and control and computing means for injecting, at very high engine loads, a first amount of fuel for a position of piston ranging between 35° and 70° before the top dead centre of this piston, followed by injection of at least a second amount of fuel, the first amount of fuel being smaller than the second.

2. A fuel injection control method for an internal-combustion engine, notably of direct injection type, comprising at least a cylinder, a piston sliding in this cylinder and comprising a teat arranged in a concave bowl, a fuel injection nozzle and a combustion chamber, characterized in that, for very high engine loads, a first amount of fuel is injected for a position of piston ranging between 35° and 70° before the top dead centre of this piston, followed by injection of at least a second amount of fuel, the first amount of fuel being smaller than the second, and in that the fuel is injected into said combustion chamber with an injection nozzle having a nappe angle ($a_1$) less than or equal to $$2 Arctg \frac{CD}{2F},$$

where CD is the diameter of the cylinder and F the distance between the point of origin of the fuel jets from the injection nozzle and the position of the piston corresponding to a crank angle of 50° to the top dead centre (TDC) of the piston.

3. A method as claimed in claim 2, characterized in that injection of the second amount of fuel starts between 20° and 35° before the piston top dead centre.

4. A method as claimed in claim 2, characterized in that injection of the second amount of fuel is continued after the piston top dead centre.

5. A method as claimed in claim 2, characterized in that the fuel is injected with a ratio of the first amount of fuel to the second amount ranging between ¹⁄₁₀ and ¹⁄₂₀.

\* \* \* \* \*